Patented May 17, 1932

1,858,928

UNITED STATES PATENT OFFICE

ERNEST F. GRETHER AND GERALD H. COLEMAN, OF MIDLAND, MICHIGAN, ASSIGNORS TO THE DOW CHEMICAL COMPANY, OF MIDLAND, MICHIGAN, A CORPORATION OF MICHIGAN

AZO DYESTUFFS DERIVED FROM AMINO-ETHERS OF HYDROXYDIARYLS

No Drawing.   Application filed June 26, 1929.   Serial No. 373,940.

The present invention is concerned with azo-dyestuffs, more particularly with azo dyes of the so-called ice-color or direct-developed type which may be produced by coupling diazotized amino-ethers of hydroxydiaryls with suitable aromatic hydroxy intermediates, and still more particularly with such dyes prepared from amino-ethers of ortho- or para-hydroxydiphenyl.

It is known that azo dyes fast to light and washing are produced by coupling diazotized aromatic amines with naphthol AS, the latter being 2.3-hydroxynaphthoic acid anilide, or with related compounds. We have found that diazotized amino-ethers of hydroxydiaryls of the general formula $NH_2—R'—O—R$ wherein $R'$ represents a diaryl residue and $R$ an alkyl-, aryl- or aralkyl-residue, more particularly amino-ethers of hydroxydiphenyl and their substituted derivatives may be employed as components for coupling with suitable aromatic nuclear hydroxy compounds, e. g. arylides, imidazoles, or azo-arylides of hydroxy-aromatic acids, or their substitution products, or other compounds as hydroxynaphtho-carbazoles, diaceto-acetic acid arylides and the like, whereby new and useful water-insoluble azo dyestuffs are formed. The invention, then, consists of the steps and new products hereinafter fully described and particularly pointed out in the claims, the following description setting forth but several of the various ways in which the principle of the invention may be used.

The herein described new azo dyestuffs dye cotton and other fibers directly in fast, clear shades, and may be prepared from the aforesaid diazotized amino-ethers as diazo-components by coupling with the above mentioned hydroxy compounds in any of the ordinary ways, e. g. dyestuffs may be applied by developing on the fiber, by printing a diazo solution upon padded goods according to the usual method, by using the nitrosamine salts of the corresponding bases, or may be prepared in substance for use as pigments. That is to say, the respective reaction components may be brought together directly, with or without the aid of a diluting or solvent medium, the dye being separated from the reaction mixture by any suitable means. Mordanting or other auxiliary treatment for promoting the absorption of the dye by the fiber, or after-treatment with metallic salts such as chromium, copper or aluminum salts, for fixing the dye or modifying its color tone may be optionally employed in conjunction with the dyeing operation without departing from the spirit of our invention which is intended to include not only the dyestuffs themselves but also material dyed therewith.

A preferred manner in which our invention may be carried out is illustrated in the following specific examples, it being understood that such examples, however, are not to be interpreted as a limitation upon the invention.

Example 1

For deleveloping the dyestuff, cotton fibers were impregnated with an aqueous alkaline solution of 2.3-hydroxynaphthoic acid alpha-naphthalide. The impregnated fibers were then rinsed in water and immersed in a dilute aqueous sodium carbonate solution to which had been added a diazo solution of 2-methoxy-5-amino-diphenyl. The dye, of deep rose-red color, developed on the fiber, and has the probable formula:

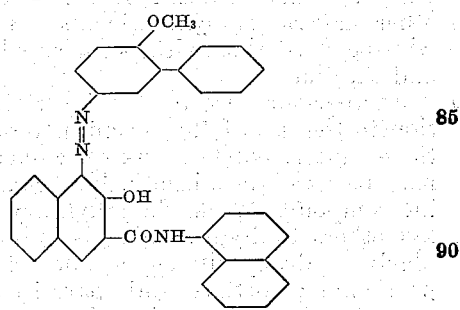

Example 2

By similar procedure as described in Example 1, diazotized 3-amino-4-methoxy-diphenyl was coupled with the 2.3-hydroxynaphthoic acid azo-arylide from meta-nitrobenzene-azo-metaphenylene diamine. The color on the fiber of the direct-developed dye was a medium dark rose-red, such dyestuff having the probable formula:

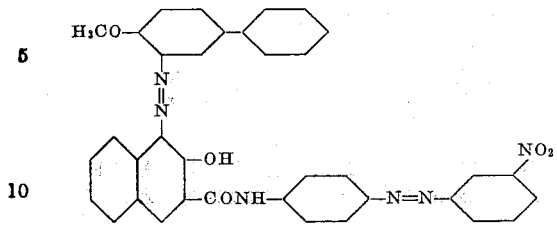

In a similar fashion we have prepared other dyes of the same general type from the intermediates as shown in the accompanying table, wherein the first and second columns, respectively, give the particular acid and amine components of the various arylide-type compounds employed.

| Acid | Amine |
|---|---|
| 1. 2.3-hydroxynaphthoic acid | Aniline |
| 2. " | o-toluidine |
| 3. " | m-nitraniline |
| 4. " | 3.4dichloro-aniline |
| 5. " | Alpha-naphthylamine |
| 6. " | m-nitrobenzene-azo-alpha-naphthylamine |
| 7. " | p-phenetole-azo-alpha-naphthylamine |
| 8. " | m-nitrobenzene-azo-m-phenylene diamine |
| 9. Salicylic acid | Benzene-azo-aniline |
| 10. Hydroxy-naphthyl-brom-benzimidazole | |

Dyes were prepared by coupling each of the diazotized amines mentioned in the examples, with each of the hydroxy intermediates listed in the above table. The salicylic acid derived azo-dyes were light straw yellow in color, the others were shades of red.

While in the examples, cotton fibers have been referred to as the material to be dyed with the herein described new dyestuffs, other natural or synthetic fibers may likewise be dyed therewith, such as silk, rayon and the like.

Furthermore, we do not limit the invention to the use of the specifically aforementioned intermediates. As diazo-components may be used the diazotizable aromatic amino-compounds from the alkyl, aryl or aralkyl ethers of hydroxydiaryls, more particularly hydroxy-diphenyls and still more particularly ortho- and para-hydroxy-diphenyls, or substituted derivatives thereof, as the halogen, nitro or other derivatives.

As azo components with which the above-said diazo-components may be coupled for the production of the so-called ice-colors or direct-developed dyestuffs, hydroxy compounds other than those specifically mentioned may be used, i. e. such as the halogen, nitro or other substituted derivatives thereof, or other suitable compounds, since it is within the purview of the invention to use the aforementioned amino-compounds in the preparation of dyes of the above type. In other words, our invention in its broader aspects concerns azo-dyes of the direct-developed type produced from diazotized amino-ethers of hydroxydiaryls by coupling with suitable hydroxy aromatic compounds.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:—

1. The method of making an azo dye which comprises coupling a diazotized amino-ether of diphenyl wherein the ether group is in the same benzene nucleus as the azo bridge, with an azo component capable of being coupled in alkaline solution with diazo-components to form direct-developed dyes.

2. The method of making azo-dyes which comprises coupling a diazotized amino-alkyl ether of diphenyl of the general formula.

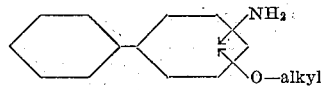

with an arylide of a hydroxy-aromatic acid such acid being of the phenyl or naphthyl series.

3. The method of making azo-dyes which comprises coupling a diazotized amino-alkyl ether of diphenyl of the general formula.

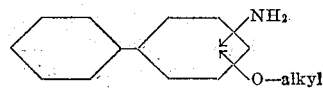

with an arylide of a 2.3-hydroxynaphthoic acid.

4. As new products, azo-dyes having the general formula,

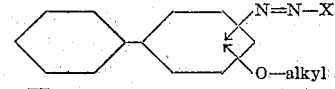

wherein X represents a residue from an arylide of a hydroxy carboxylic acid of the benzene or naphthalene series.

5. As new products, azo-dyes having the general formula,

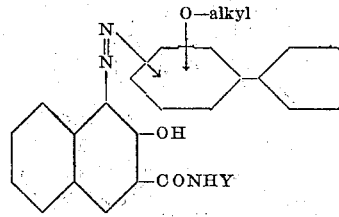

wherein Y represents any univalent aromatic group of the benzene or naphthalene series.

6. As a new compound, an azo dye having the general formula,

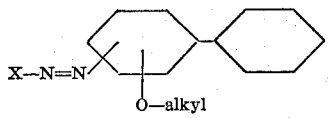

wherein X represents an arylide component capable of being coupled in alkaline solution with a diazotized aromatic amino compound to form a direct-developed azo dye.

7. As a new compound, an azo dye having the general formula

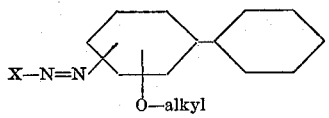

wherein X represents an azo component capable of being coupled in alkaline solution with a diazotized aromatic amino compound to form a direct developed azo dye.

8. The method of making azo-dyes which comprises coupling a diazotized amino-alkyl ether of diphenyl, said ether having probably the formula;

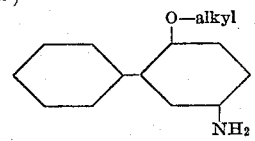

with an azo component capable of being coupled in alkaline solution with diazo-components to form direct-developed dyes.

9. The method of making azo-dyes which comprises coupling a diazotized amino-alkyl ether of diphenyl, said ether having probably the formula;

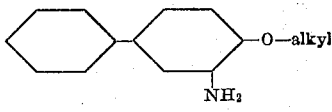

with an azo component capable of being coupled in alkaline solution with diazo-components to form direct-developed dyes.

10. The method of making azo-dyes which comprises coupling diazotized 2-methoxy-5-amino-diphenyl with an arylide of 2.3-hydroxynaphthoic acid.

11. The method of making azo-dyes which comprises coupling diazotized 4-methoxy-5-amino-diphenyl with an arylide of 2.3-hydroxynaphthoic acid.

12. As a new compound, an azo-dye having probably the formula;

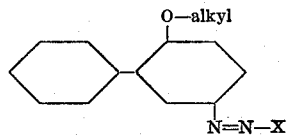

wherein X represents an arylide of 2.3-hydroxynaphthoic acid.

13. As a new compound, an azo-dye having probably the formula;

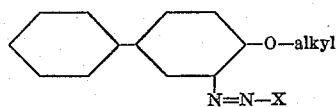

wherein X represents an arylide of 2.3-hydroxynaphthoic acid.

14. As a new compound, an azo-dye having probably the formula;

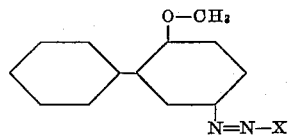

wherein X represents an arylide of 2.3-hydroxynaphthoic acid.

15. As a new compound, an azo-dye having probably the formula;

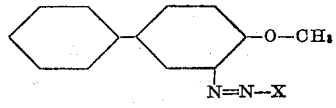

wherein X represents an arylide of 2.3-hydroxynaphthoic acid.

Signed by us this 19th day of June, 1929.
ERNEST F. GRETHER.
GERALD H. COLEMAN.